Sept. 26, 1939.　　　　R. S. SUMNER　　　　2,174,020
MOVING PICTURE APPARATUS
Filed Sept. 30, 1936
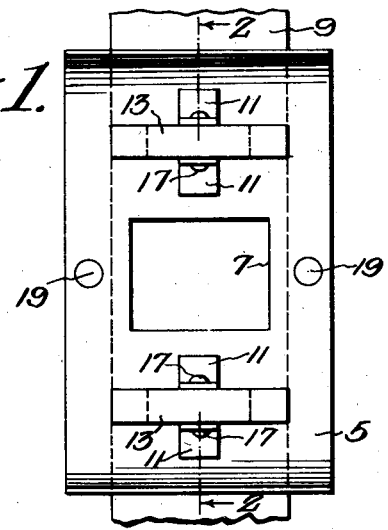
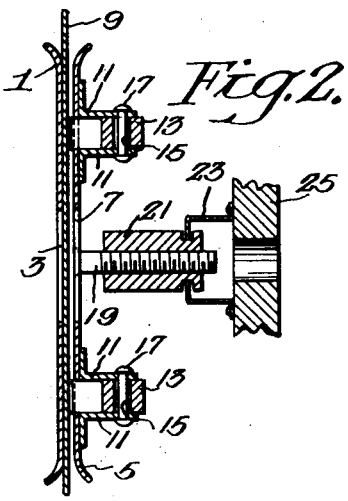
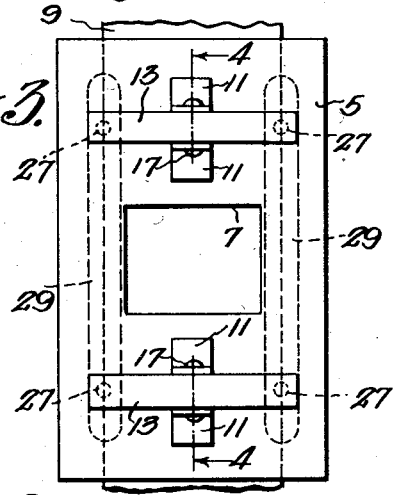
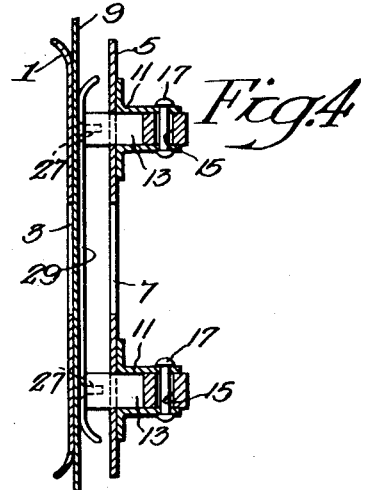
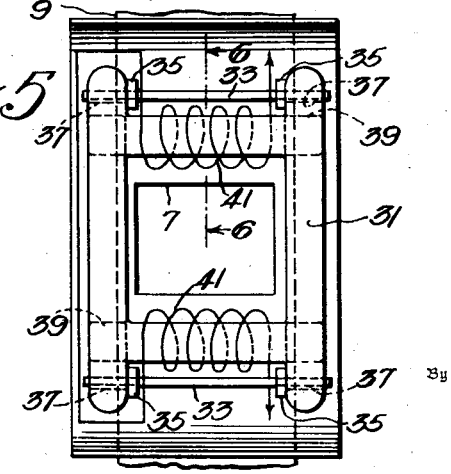
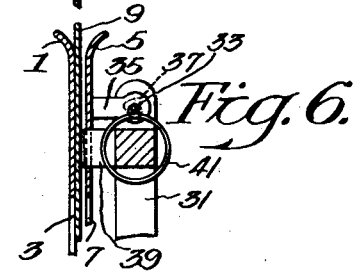
Inventor
Raymond S. Sumner
By
Attorney Patented Sept. 26, 1939

2,174,020

UNITED STATES PATENT OFFICE 2,174,020

MOVING PICTURE APPARATUS

Raymond S. Sumner, Audubon, N. J., assignor to Radio Corporation of America, a corporation of Delaware Application September 30, 1936, Serial No. 103,255

4 Claims. (Cl. 88—17)

This invention relates to moving picture apparatus, and more particularly to film gate structure therefor.

Film gates are provided in moving picture machines for maintaining the film in proper relation to the optical system. Various mechanisms have been proposed in the prior art for guiding the film properly through the gate structure and for holding it in fixed position with respect to the aperture plate when the intermittent mechanism is at rest. Practically all of such mechanisms with which I am familiar employ spring devices which, after a period of use, become weak and ineffective for their intended purposes and therefore must be either readjusted or entirely replaced. Even if the spring devices do not weaken, it is extremely difficult to maintain uniform tension with all of them. Also, many of these prior art mechanisms are fairly complicated in construction and expensive.

The primary object of my invention is to provide an improved moving picture film gate which is free from the aforementioned and other disadvantages of prior art gates.

More specifically, it is an object of my invention to provide improved film gate structure which will not lose its efficiency even after considerable use.

Another object of my invention is to provide an improved film gate which will always maintain the film in flat and even condition while fed past the exposure aperture of the gate.

Still another object of my invention is to provide an improved film gate which will hold the film absolutely stationary when the intermittent feed mechanism is at rest.

A further object of my invention is to provide an improved film gate which may be readily adjusted to apply proper tension to the film.

Still a further object of my invention is to provide an improved film gate which will readily accommodate itself to variations in thickness of the film, such as splices or other irregularities, and which will, therefore, maintain substantially uniform tension on the film at all times.

Another object of my invention is to provide an improved film gate which will not scratch or otherwise mar the film.

It is also an object of my invention to provide an improved film gate as aforesaid which will permit facile and rapid threading of the film therein, and which is particularly adapted to self-threading apparatus.

A further object of my invention is to provide an improved film gate of the type set forth which is exceedingly simple in construction, yet highly efficient in use, and which, by reason of its simplicity, readily lends itself to the requirements of easy, rapid and economical commercial manufacture.

In accordance with my invention, I make one of two associated aperture plates of magnetic material and the other one of non-magnetic material, and I mount upon the latter aperture plate one or more magnets which are arranged to cooperate with the magnetic aperture plate to hold the film in the gate and to apply proper pressure thereto. The magnets may be either permanent magnets or electromagnets, and they may be placed around the apertures, or above and below the same, or to one side thereof, or, in fact, along any edge or edges thereof, as may be found most suitable. Preferably, the magnets are so mounted on their supporting aperture plate that they have a slight limited movement relative to the magnetic aperture plate both pivotally and axially, which permits them to readily accommodate themselves to variations in thickness of the film, and thus to always maintain uniform pressure on the film.

The novel features that I consider characteristic of my invention are set forth with particularity in the appended claims. The invention itself, however, both as to its organization and method of operation, as well as additional objects and advantages thereof, will best be understood from the following description of several embodiments thereof when read in connection with the accompanying drawings in which Figure 1 is an elevation of one form of my invention, Figure 2 is a central section thereof taken on the line 2—2 of Fig. 1, Figure 3 is an elevation of another form of my invention, Figure 4 is a central section thereof taken on the line 4—4 of Fig. 3, Figure 5 is an elevation of still another form of my invention, and Figure 6 is a fragmentary section thereof taken on the line 6—6 of Fig. 5.

Referring more specifically to the drawing, wherein similar reference characters designate corresponding parts throughout, I have shown, in Figs. 1 and 2, a film gate comprising a fixed aperture plate 1 of magnetic material having the usual aperture 3 therein and a movably mounted aperture plate 5 of non-magnetic material associated with the aperture plate 1 and having an aperture 7 therein aligned with the aperture 3 and with the usual optical system (not shown) conventionally included in motion picture apparatus. The plates 1 and 5 are slightly spaced from one another to permit passage of a moving picture film 9 therebetween, as when the film is advanced through the gate by suitable intermittent mechanism (not shown).

Struck out from or suitably secured to the aperture plate 5 are a plurality of bracket members or lugs 11 which support a pair of permanent U-shaped magnets 13 the arms of which extend through the plate 5 toward the aperture plate 1 and the pole faces of which face the plate 1, the pole faces being slightly spaced from the aperture plate 1 to provide air gaps therebetween in which the film can be accommodated. The film 9 is pressed against the aperture plate 1 by the magnets 13 under the influence of the magnetic attraction between the magnets and the magnetic aperture plate 1. Preferably, the magnets 13 are bored at 15 and are pivotally mounted on the brackets 11 by means of pins 17 which pass through the bore 15, the latter being of somewhat larger diameter than the pins 17 to provide a slight clearance which will permit the magnets to move somewhat relative to the aperture plate 1 and thus readily accommodate themselves to variations in thickness of the film. This is desirable to take care of splices in the film, wear of emulsion thereon, and other similar conditions. To avoid scratching or otherwise marring the film mechanically, both the surface of the plate 1 with which the film contacts and the pole faces of the magnets may be highly polished to provide smooth film engaging surfaces. The pole faces are also preferably chamfered at their edges to avoid sharp corners which might ordinarily cause slight chattering of the magnets as the film passes them.

Since the pressure against the film 9 is determined by the force of attraction between the magnets 13 and the aperture plate 1 and this force is a function of the distance between the magnets and the aperture plate 1, it is obvious that the pressure may be controlled by varying the air gaps. For this purpose, the aperture plate 5 may be provided with a plurality of rearwardly extending bolts 19, each of which threadedly receives a nut 21. The nuts 21 each have an annular groove which receives the flanged end of a supporting member 23 fixed to a suitable stationary support 25. Rotation of the nuts 21 in one direction or the other will serve to bring the aperture plate 5 closer to or farther away from the aperture plate 1 to vary the air gaps between the pole faces of the magnets 13 and the aperture plate 1 and thus vary the pressure applied to the film.

In the modification of my invention shown in Figs. 3 and 4, the pole faces of the magnets 13, instead of contacting the film directly, have secured thereto, as by means of screws 27, a pair of pressure shoes 29, the pressure shoes being located one on each side of the apertures 3 and 7. In all other respects, this modification of my invention is similar to that described above in connection with Figs. 1 and 2. The pressure shoes 29 are preferably made of magnetic material, although this is not essential, especially where they are made of thin stock. The use of pressure shoes, as in this modification of my invention, has the advantage of providing greater area of contact with the film and a more even distribution of the pressure applied thereto. As in the modification shown in Figs. 1 and 2, the last described modification may be provided with means similar to the bolts 19 and the nuts 21 for adjusting the air gaps through which the film passes whereby to control the pressure applied to the film.

In the modification of my invention shown in Figs. 5 and 6, I employ an electromagnet 31 instead of the permanent magnets 13 shown in Figs. 1 to 4. The electromagnet 31 may be substantially rectangular in form and is supported on the aperture plate 5 about the aperture 7 therein by means of transversely extending pins 33 supported on a plurality of lugs 35 formed on the aperture plate 5. As in the case of the two modifications previously described, the diameter of the bores 37 in the frame of the electromagnets 31 is preferably made slightly larger than the diameter of the pins 33, so that the electromagnet 31 may have limited movement with respect to the aperture plate 1. The electromagnet 31 is provided with forwardly extending pole pieces 39 which extend through suitable openings in the aperture plate 5, as clearly shown in Fig. 6, and the faces of which act similarly to the pole faces of the magnets 13 in the modification shown in Figs. 1 and 2. By varying the strength of the current through the winding 41, it is clear that the field strength, and thus the pressure applied to the film, can be varied. This pressure may also be adjusted in a manner similar to that heretofore described in connection with the modifications shown in Figs. 1 to 4.

From the foregoing description, it will be apparent that I have provided an improved film gate which has many inherent advantages, particularly those of applying uniform pressure to the film and of reducing wear upon the film to a minimum. My invention is particularly well adapted to motion picture apparatus of the self-threading type, this being especially true of the modification shown in Figs. 5 and 6. For example, in the latter modification, the electrical circuit including the winding may be so arranged that, during the threading operation, no current will pass through the winding 41 whereby substantially no resistance will be offered to the passage of the film 9 through the film gate. As soon, however, as the threading operation is completed, the winding 41 may be energized to provide the necessary flux for operation of the film gate in the manner heretofore described. The winding 41 may be arranged to be energized either automatically, or it may be controlled manually by the operator.

While I have described several embodiments of my invention, I am fully aware that many other modifications thereof and changes therein are possible. For example, instead of mounting the magnets 13 above and below the aperture 7, as in the modifications of Figs. 1 to 4, inclusive, they may be mounted one on each side of the aperture 7, or along any edge thereof, with equally satisfactory results. If desired, a pair of magnets may be mounted along the sides of the film gate in the modification of Figs. 1 and 2 in addition to those shown. In any case, the magnets 13 may be electromagnets instead of permanent magnets, and the flux controlled for automatic threading in a manner similar to that described with reference to Figs. 5 and 6. Also, instead of making the aperture plate 1 of magnetic material in its entirety, it may be made of non-magnetic material and provided with inserts or laminae of magnetic material for cooperation with the pole faces of the magnets 13 or the electromagnet 31, and wherever I have used the expression "aperture plate of magnetic material" in this specification and the claims, I intend this to include also a non-magnetic aperture plate provided with magnetic members in the manner just described. Many other changes will, no doubt, readily suggest themselves to those skilled in the art. I therefore desire that my invention shall not be limited except insofar as is necessitated by the prior art and by the spirit and scope of the appended claims.

I claim as my invention:

1. In moving picture apparatus, the combination of an aperture plate of magnetic material, a second aperture plate of non-magnetic material associated therewith, and U-shaped magnetic means movably mounted for limited movement on said second aperture plate in cooperative relation to said first named aperture plate, said magnetic means including pole faces arranged for holding the edges of a film thereagainst.

2. In moving picture apparatus, the combination of an aperture plate of magnetic material, a second aperture plate of non-magnetic material associated therewith, magnetic means carried by said second named plate, said magnetic means having a plurality of pole faces and being so arranged with respect to said first named plate as to provide air gaps between said first named plate and said pole faces through which a film is adapted to pass, and means for adjusting said air gaps.

3. In moving picture apparatus, the combination of an aperture plate of magnetic material, a second aperture plate of non-magnetic material associated therewith, magnetic means mounted on said second named plate for limited movement relative to said first named plate, said magnetic means having a plurality of pole faces arranged to cooperate with said first named plate to provide air gaps therebetween through which a film is adapted to pass, and means for adjusting said air gaps.

4. In moving picture apparatus, the combination of an aperture plate of magnetic material, a second aperture plate of non-magnetic material associated therewith, magnetic means carried by said second named plate and having a plurality of pole faces facing said first named plate, and a pair of pressure shoes secured to said pole faces and adapted to press a film against said first named plate under the influence of magnetic attraction between said magnetic means and said first named plate.

RAYMOND S. SUMNER.